United States Patent [19]

Migdal et al.

[11] Patent Number: 5,162,086

[45] Date of Patent: Nov. 10, 1992

[54] DISPERSANT ADDITIVE AND LUBRICATING OIL COMPOSITION CONTAINING SAME

[75] Inventors: Cyril A. Migdal, Croton-on-Hudson; Maria M. Kapuscinski, Carmel; Theodore E. Nalesnik, Wappingers Falls, all of N.Y.

[73] Assignee: Texaco Inc., White Plains, N.Y.

[21] Appl. No.: 704,166

[22] Filed: May 22, 1991

[51] Int. Cl.$^5$ ............................................. C10M 151/02
[52] U.S. Cl. ................................... 252/47.5; 525/301; 525/331.7; 525/331.8; 525/375
[58] Field of Search ........................ 252/47.5; 525/301

[56] References Cited

U.S. PATENT DOCUMENTS 4,160,739  7/1979  Stambaugh et al. ................ 525/301
4,517,104  5/1985  Bloch et al. ........................ 525/301
4,816,172  3/1989  Kapuscinski et al. ............. 252/47.5

Primary Examiner—Ellen McAvoy
Attorney, Agent, or Firm—Robert A. Kulason; James J. O'Loughlin; Vincent A. Mallare

[57] ABSTRACT

An additive composition comprising a graft and amine-derivatized copolymer prepared from ethylene and at least one $C_3$ to $C_{10}$ alpha-monoolefin and, optionally, a polyene selected from non-conjugated dienes and trienes comprising from about 15 to 80 mole percent of ethylene, from about 20 to 85 mole percent of said $C_3$ to $C_{10}$ alpha-monoolefin and from about 0 to 15 mole percent of said polyene, the copolymer having a number average molecular weight ranging from about 5,500 to about 50,000 and having grafted thereon at least 1.8 molecules of a carboxylic acid acylating function per molecule of the copolymer and reacting the grafted copolymer with an amine substituted phenothiazine to form the grafted and amine-derivatized copolymer, and a lubricating oil composition containing same are provided.

20 Claims, No Drawings

DISPERSANT ADDITIVE AND LUBRICATING OIL COMPOSITION CONTAINING SAME

BACKGROUND OF THE INVENTION

This invention relates to a bifunctional lubricant additive which provides surprising dispersancy properties when employed in a single grade lubricating oil composition.

A problem other than dispersancy facing the lubricant manufacturer is that of seal deterioration in the engine. All internal combustion engines use elastomer seals, such as Viton seals, in their assembly. Over time, these seals are susceptible to serious deterioration caused by the lubricating oil composition. A lubricating oil composition that degrades the elastomer seals in an engine is unacceptable to engine manufacturers and has limited value.

An important property of a lubricating oil additive and a blended lubricating oil composition containing such additives is the compatibility of the oil composition with the rubber or elastomer seals employed in the engine. Nitrogen-containing succinimide dispersants employed in crankcase lubricating oil compositions typically have the effect of seriously degrading the rubber seals in internal combustion engines. In particular, such dispersants are known to attack Viton AK-6 rubber seals. This deterioration exhibits itself by sharply degrading the flexibility of the seals and increasing these hardness. This is such a critical problem that Volkswagen Corporation requires that al crankcase lubricating oils must pass a Viton Seal Compatibility Test before the oil composition will be rated acceptable for engine crankcase service. The polymeric dispersants of the present invention exhibit improved Viton Seal Compatibility is the trademark for a series of fluoroelastomers based on copolymers of vinylidene fluoride and hexafluoropropylene, produced by DuPont de Nemours, E. I. & Company of Wilmington, Del.

DISCLOSURE STATEMENT

Ethylene-propylene copolymers and ethylene-alpha olefin non-conjugated diene terpolymers which have been grafted and derivatized to provide valuable properties in lubricating oil compositions are well known.

U.S. Pat. No. 3,522,180 discloses a method for the preparation of an ethylene-propylene copolymer substrate effective as a viscosity index improver for lubricating oils.

U.S. Pat. No. 4,026,809 discloses graft copolymers of a methacrylate ester and an ethylene-propylene-alkylidene norbornene terpolymer as a viscosity index improver for lubricating oils.

U.S. Pat. No. 4,089,794 discloses ethylene copolymers derived from ethylene and one or more $C_3$ to $C_{28}$ alpha olefin solution grafted with an ethylenically-unsaturated carboxylic acid material followed by a reaction with a polyfunctional material reactive with carboxyl groups, such as a polyamine, a polyol, or a hydroxylamine which reaction product is useful as a sludge and varnish control additive in lubricating oils.

U.S. Pat. No. 4,137,185 discloses a stabilized imide graft of an ethylene copolymer additive for lubricants.

U.S. Pat. No. 4,146,489 discloses a graft copolymer where the backbone polymer is an oil-soluble ethylene-propylene copolymer or an ethylene-propylene-diene modified terpolymer with a graft monomer of C-vinylpyridine or N-vinylpyrrolidone to provide a dispersant VI improver for lubricating oils.

U.S. Pat. No. 4,234,435 discloses carboxylic acid acylating agents derived from polyalkenes and a carboxylic reactant having a molecular weight from about 1300 to 5000 and having at least 1.3 carboxylic groups per equivalent of polyalkene useful as a lubricant additive.

U.S. Pat. No. 4,320,019 discloses a multipurpose lubricating additive prepared by the reaction of an interpolymer of ethylene and a $C_3$ to $C_8$ alpha-monoolefin with an olefinic carboxylic acid acylating agent to form an acylating reaction intermediate which is then reacted with an amine.

U.S. Pat. No. 4,340,689 discloses a process for grafting a functional organic group onto an ethylene copolymer or an ethylene-propylene-diene terpolymer.

U.S. Pat. No. 4,357,250 discloses a reaction product of a copolymer and an olefin carboxylic acid via the "ene" reaction followed by a reaction with a monoamine-polyamine mixture.

U.S. Pat. No. 4,382,007 discloses a dispersant - VI improver prepared by reacting a polyamine-derived dispersant with an oxidized ethylene-propylene polymer or an ethylene-propylene diene terpolymer.

U.S. Pat. No. 4,144,181 discloses polymer additives for fuels and lubricants comprising a grafted ethylene copolymer reacted with a polyamine, polyol or hydroxylamine and finally reacted with an alkaryl sulfonic acid.

U.S. Pat. No. 4,863,623 discloses multi-functional grafted and derivatized copolymers which provide viscosity index improvement, dispersancy and antioxidant properties in a multi-grade lubricating oil composition.

Co-pending U.S. application Ser. No. 07/628,050 now U.S. Pat. No. 5,075,383 filed on Dec. 17, 1990, discloses an additive composition comprising a graft and amine-derivatized copolymer prepared from ethylene and at least one $C_3$ to $C_{10}$ alpha-monoolefin and, optionally, a polyene selected from non-conjugated dienes and trienes comprising from about 15 to 80 mole percent of ethylene, from about 20 to 85 mole percent of said $C_3$ to $C_{10}$ alpha-monoolefin and from about 0 to 15 mole percent of said polyene, said copolymer having a number average molecular weight ranging from about 5,500 to 50,000 and having grafted thereon at least 1.8 molecules of a carboxylic acid acylating function per molecule of said copolymer and reacting said grafted copolymer with an amino-aromatic polyamine compound from the group consisting of an N-arylphenylenediamine, an aminocarbazole, an aminoindole, an amino-indazolinone, an aminomercaptotriazole, and an aminoperimidine to form said graft and amine-derivatized copolymer, and a lubricating oil composition containing same are provided.

The disclosures in the foregoing patents which relate to VI improvers and dispersants for lubricating oils; namely, U.S. Pat. Nos. 3,522,180, 4,026,809, 4,089,794, 4,137,185, 4,144,181, 4,146,489, 4,234,435, 4,320,019, 4,340,689, 4,357,250, 4,382,007 and 4,863,623 are incorporated herein by reference.

An object of this invention is to provide a novel derivatized graft copolymer composition.

Another object of the invention is to provide a lubricant additive effective for imparting dispersancy properties to a single grade lubricating oil composition.

A further object is to provide a novel lubricating oil composition containing the graft copolymer additive of the invention as well as to provide concentrates of the novel additive of invention.

And another object is to provide a novel lubricating oil composition which does not degrade elastomer seals in internal combustion engines.

SUMMARY OF THE INVENTION

A dispersant additive composition prepared by the steps comprising:

(a) reacting a polymer prepared from ethylene and at least one $C_3$ to $C_{10}$ alpha-monoolefin and, optionally, a polyene selected from non-conjugated dienes and trienes comprising from about 15 to 80 mole percent of ethylene from about 20 to 85 mole percent of said $C_3$ to $C_{10}$ alpha-monoolefin and from about 0 to 15 mole percent of said polyene, said polymer having a number average molecular weight ranging above 80,000, with an excess in equivalence of an olefinic carboxylic acid acylating agent per equivalent weight of said polymer, said process comprising heating said polymer to a molten condition at a temperature ranging from about 250° C. to about 450° C. and, simultaneously, or sequentially in any order, reducing the molecular weight of the polymer with mechanical shearing means and grafting the olefinic carboxylic acylating agent onto said polymer, thereby producing a grafted, reduced molecular weight polymer having a number average molecular weight ranging from about 5,500 to about 50,000 and having at least 1.8 molecules of said carboxylic acid acylating function grafted onto each copolymer molecule of the reduced polymer;

(b) reacting said grafted reduced polymer in (a) with an amine substituted phenothiazine:

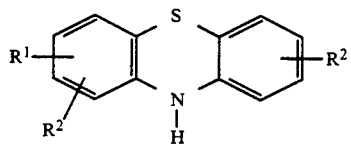

where $R^1$ is $—NH_2$,

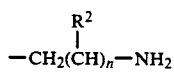

in which n has a value from 1-10, $NH_2$-aryl-, or $NH_2$-arylalkyl-; and $R^2$ is H, or a ($C_1$-$C_{24}$) branched or straight chain alkyl, alkenyl, alkoxy, aralkyl, hydroxy or aminoalkyl radical to provide the dispersant additive reaction product; and (c) recovering the dispersant additive reaction product.

The novel lubricant of the present invention comprises an oil of lubricating viscosity and an effective dispersant amount of the novel dispersant additive reaction product. This unique product is specifically useful for a single grade lubricating oil composition.

Concentrates of the reaction product of the present invention are also contemplated.

DETAILED DESCRIPTION OF THE INVENTION

The polymer or copolymer substrate employed in the novel additive of the invention may be prepared from ethylene and propylene or it may be prepared from ethylene and a higher olefin within the range of $C_3$ to $C_{10}$ alpha-monoolefins.

More complex polymer substrates, often designated as interpolymers, may be prepared using a third component. The third component generally used to prepare an interpolymer substrate is a polyene monomer selected from non-conjugated dienes and trienes. The non-conjugated diene component is one having from 5 to 14 carbon atoms in the chain. Preferably, the diene monomer is characterized by the presence of a vinyl group in its structure and can include cyclic and bi-cyclo compounds. Representative dienes include 1,4-hexadiene, 1,4-cyclohexadiene, dicyclopentadiene, 5-ethylidene-2-norbornene, 5-methylene-2-norbornene, 1,5-heptadiene, and 1,6-octadiene. A mixture of more than one diene can be used in the preparation of the interpolymer. A preferred non-conjugated diene for preparing a terpolymer of interpolymer substrate is 1,4-hexadiene.

The triene component will have at least two non-conjugated double bonds, and up to about 30 carbon atoms in the chain. Typical trienes useful in preparing the interpolymer of the invention are 1-isopropylidene-3a,4,7,7a-tetrahydroindene, 1-isopropylidenedicyclopentadiene, dehydro-isodicyclopenta-diene, and 2-(2-methylene-4-methyl-3-pentenyl)[2.2.1] bicyclo-5-heptene.

The polymerization reaction used to form the polymer substrate is generally carried out in the presence of a catalyst in a solvent medium. The polymerization solvent may be any suitable inert organic solvent that is liquid under reaction conditions for solution polymerization of monoolefins which is generally conducted in the presence of a Ziegler type catalyst. Examples of satisfactory hydrocarbon solvents include straight chain paraffins having from 5 to 8 carbon atoms, with hexane being preferred. Aromatic hydrocarbons, preferably aromatic hydrocarbon having a single benzene nucleus, such as benzene, toluene and the like; and saturated cyclic hydrocarbons having boiling point ranges approximating those of the straight chain paraffinic hydrocarbons and aromatic hydrocarbons described above, are particularly suitable. The solvent selected may be mixture of one or more of the foregoing hydrocarbons. It is desirable that the solvent be free of substances that will interfere with a Ziegler polymerization reaction.

In a typical preparation of a polymer substrate, hexane is first introduced into a reactor and the temperature in the reactor is raised moderately to about 30° C. Dry propylene is fed to the reactor until the pressure reaches about 40 to 45 inches of mercury. The pressure is then increased to about 60 inches of mercury and dry ethylene and 5-ethylidene-2-norbornene are fed to the reactor. The monomer feeds are stopped and a mixture of aluminum sesquichloride and vanadium oxytrichloride are added to initiate the polymerization reaction. Completion of the polymerization reaction is evidenced by a drop in the pressure in the reactor.

Ethylene-propylene or higher alpha monoolefin copolymers may consist of from about 15 to 80 mole percent ethylene and from about 20 to 85 mole percent propylene or higher monoolefin with the preferred mole ratios being from about 25 to 75 mole percent ethylene and from about 25 to 75 mole percent of a $C_3$ to $C_{10}$ alpha monoolefin with the most preferred proportions being from 25 to 55 mole percent propylene and 45 to 75 mole percent ethylene.

Terpolymer variations of the foregoing polymers may contain from about 0.1 to 10 mole percent of a non-conjugated diene or triene.

The starting polymer substrate for preparing the additive of the invention, that is, the ethylene copolymer or terpolymer, is an oil-soluble, substantially linear, rubbery material having a number average molecular weight above about 80,000. Many polymerization processes produce high molecular weight polymers having molecular weights substantially above 80,000 and commonly ranging from 100,000 to 300,000 molecular weight and above. These high molecular weight polymers which provide viscosity index improvement properties when employed in multi-grade lubricating oil compositions must be modified in order to provide a dispersant-antioxidant additive specifically suitable for single grade motor oil compositions. For the purposes of this invention, the high molecular weight polymer substrates must be substantially reduced in molecular weight or substantially degraded to the prescribed molecular weight range in order to be useful for the purposes intended.

High molecular weight polymer substrates or interpolymers are available commercially such as those containing from about 40 to about 60 mole percent ethylene units and about 60 to about 40 mole percent propylene units. Examples are "Ortholeum 2052" and "PL-1256" available from E. I. dupont denemours and Co. The former is a terpolymer containing about 48 mole percent ethylene units, 48 mole percent propylene units and 4 mole percent, 1,4-hexadiene units, having an inherent viscosity of 1.35. The latter is a similar polymer with an inherent viscosity of 1.95. The viscosity average molecular weights of these polymers are on the order of 200,000 and 280,000, respectively.

The terms polymer and copolymer are used generically to encompass ethylene copolymers, terpolymers or interpolymers. These materials may contain minor amounts of other olefinic monomers so long as their basic characteristics are not materially changed.

An ethylenically unsaturated carboxylic acid material is grafted onto the prescribed polymer backbone. These materials which are attached to the polymer contain at least one ethylenic bond and at least one, preferably two, carboxylic acid or its anhydride groups or a polar group which is convertible into said carboxyl groups by oxidation or hydrolysis. Maleic anhydride or a derivative thereof is preferred. It grafts onto the ethylene copolymer or terpolymer to give two carboxylic acid functionalities. Examples of additional unsaturated carboxylic materials include chlormaleic anhydride, itaconic anhydride, or the corresponding dicarboxylic acids, such as maleic acid, fumaric acid and their monoesters.

The reduction of the molecular weight of the starting ethylene copolymer having a molecular weight above 80,000 to a molecular weight ranging from 5,500 to 50,000 (this molecular weight range corresponds to about 300-25,000 Cst kinetic viscosity of a 37% concentrate of the finished dispersant) and the grafting of the ethylenically unsaturated carboxylic acid material onto the copolymer may be accomplished simultaneously or it may be accomplished sequentially in any order. If done sequentially, the ethylene copolymer may first be degraded to the prescribed molecular weight and then grafted or, conversely, the grafting may be effected onto the high molecular weight copolymer and the resulting high molecular weight grafted copolymer then reduced in molecular weight. Alternatively, grafting and reduction of the high molecular weight copolymer may be done simultaneously.

Reduction of the molecular weight of the high molecular weight ethylene copolymer to the prescribed molecular weight range, whether grafted, during grafting or prior to grafting, is conducted in the absence of a solvent or in the presence of a base oil, using a mechanical shearing means. Generally, the ethylene copolymer is heated to a molten condition at a temperature in the range of 250° C. to 450° C. and it is then subjected to mechanical shearing means until the copolymer is reduced to the prescribed molecular weight range. The shearing may be effected by forcing the molten copolymer through fine orifices under pressure or by other mechanical means.

The grafting of the ethylenically unsaturated carboxylic acid material onto the copolymer either before or after the ethylene copolymer is reduced in molecular weight or during the shearing of the copolymer may be conducted in the presence of a free radical initiator.

The amount of the carboxylic acid material that is grafted onto the prescribed polymer backbone is critical. Thus, at least 1.8 molecules of the carboxylic acid material must be reacted with each molecule of the polymer backbone. It is preferred to react the two or more moles of the carboxylic acid material with each equivalent amount of the polymer. Broadly, the carboxylic acid material should be employed in the ratio from 1.8 to 5 molecules per molecule of the polymer backbone with a preferred ratio being from 2 to 5 molecules and a still more preferred ratio being from 2.25 to 4 molecules. Highly effective additive materials have from 2.5 molecules to 3.5 molecules of the carboxylic acid material or maleic anhydride grafted onto each polymer molecule.

The free-radical initiators which may be used are peroxides, hydroperoxides, and azo compounds and preferably those which have a boiling point greater than about 100° C. and decompose thermally within the grafting temperature range to provide free radicals. Representative of these free-radical initiators are azobutyronitrile and 2,5-dimethyl-hex-3-yne-2,5 bis-tertiary-butyl peroxide. The initiator is used in an amount of between about 0.005% and about 1% by weight based on the weight of the reaction mixture solution. The grafting is preferably carried out in an inert atmosphere, such as under nitrogen blanketing. The resulting polymer intermediate is characterized by having carboxylic acid acylating functions within its structure.

The grafted reduced polymer possessing carboxylic acid acylating functions is reacted with an amine substituted phenothiazine represented by the formula

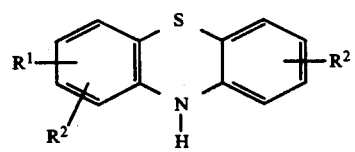

where $R^1$ is $-NH_2$,

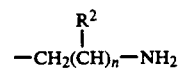

in which n has a value from 1-10, $NH_2$-aryl-, or $NH_2$-arylalkyl-; and $R^2$ is H, or a ($C_1$-$C_{24}$) branched or straight chain alkyl, alkenyl, alkoxy, aralkyl, hydroxy or aminoalkyl radical to provide the dispersant additive reaction product.

In order to illustrate and show the advantages and important features of the present invention, the following Examples are provided.

EXAMPLE I

The Mechanical/Thermal Shearing Preparation Of Low Molecular-Ethylene-Propylene Copolymer Utilizing An Extruder The ethylene-propylene copolymer of about 100,000 number average molecular weight was chopped and processed through an extruder in a molten state at a temperature near 400° C. Just prior to entering the extruder screw, maleic anhydride was mixed with the molten polymer and the polymer exiting from the die face of the extruder was grafted with approximately 1.8 molecules of maleic anhydride per copolymer molecule grafted with approximately 1.8 molecules maleic anhydride per copolymer molecule (1000 g) was dissolved in SNO 100 upon exit from the extruder resulting in an approximate 50% concentrate in oil.

EXAMPLE II

Preparation Of Dispersant From Ethylene-Propylene Copolymer Grafted With Approximately 1.8 Molecules Maleic Anhydride Per Copolymer Molecule A 48.4 weight percent mixture of ethylene-propylene copolymer grafted with approximately 1.8 molecules of maleic anhydride per copolymer molecule (Example I) in oil (700.0 g) was charged into a 3000 mL 4-neck kettle along with SNO oil (321.1 g). The kettle was equipped with a mechanical stirrer, thermometer, thermocouple, and nitrogen inlet and heated to 160° C. Next, an amine substituted (19.3 g, 0.0795 moles) was added along with Surfonic L-46-7 (31-1 g). The reaction temperature was maintained at 160° C. for 6 hours. The product (an approximately 33% concentrate) analyzed as follows: %N=0.24 (0.21 calc.), and Kinetic Viscosity=1055.6 cSt @100° C.

EXAMPLE III

Preparation of Dispersant From Ethylene-Propylene Copolymer Grafted With Approximately 1.8 Molecules Maleic Anhydride Per Copolymer Molecule A 48.4 weight percent mixture of ethylene-propylene copolymer grafted with approximately 1.8 molecules of maleic anhydride per copolymer molecule (Example I) oil (900.0 g) was charged into a 3000 mL 4-neck kettle along with SNO oil (279.7 g). The kettle was equipped with a mechanical stirrer, thermometer, thermocouple, and nitrogen inlet and heated to 180° C. Next, an amine substituted (24.7 g, 0.102 moles) was added along with Sulfonic L-46-7 (34.8 g). The reaction temperature was maintained at 180° C. for 6 hours. The product (an approximately 37% concentrate) analyzed as follows: % N=0.34 (0.21 calc.), and Kinetic Viscosity=1729.6 Cst @100° C.

EXAMPLE IV

Preparation of Dispersant-Antioxidant From Ethylene-Propylene Copolymer Grafted With Approximately 1.8 Molecules Maleic Anhydride Per Copolymer Molecule A 48.4 weight percent mixture of ethylene-propylene copolymer grafted with approximately 1.8 molecules maleic anhydride per copolymer molecule in oil (1800.0 g) was charged into a 4000 Ml 4-neck kettle along with SNO 100 oil (572.7 g). The kettle was equipped with a mechanical stirrer, thermometer, thermocouple, and nitrogen inlet and heated to 180° C. Next, an amine substituted phenothiazine 49.7 g, 0.205 moles) was added along with Surfonic L-46-7 (70.0 g). The reaction temperature was maintained at 180° C. for 6 hours. The product (an approximately 37% concentrate) analyzed as follows: % N=0.43 (0.21 calc.), and Kinetic Viscosity=1576.4 Cst @100° C.

EXAMPLE V—(Comparative)

Preparation Of Acylated Mono-and/or Bis-Alkenyl Succinimide Dispersant

A solution of Polyisobutenylsuccinic acid anhydride (3732.0g., 2.0 moles, PIBSA prepared from an approximately 1200 mol wt polybutene) and 100 P Pale oil (3300.0 g) was charged into a twelve liter 3-neck flask equipped with a mechanical stirrer, thermometer, thermocouple, and nitrogen inlet and heated to 60° C. Next, tetraethylenepentamine (207.9 g, 1.1 moles) was added and the heat was increased to 120° C. and maintained for 4 hours to drive off water. The hot mixture (~100° C.) was filtered through diatomaceous earth filter aid. The product (an approximately 40% concentrate) analyzed as follows: % N=1.01 (0.8 calc.) and Kinematic Viscosity (100° C.) 100 Cst.

EXAMPLE VI—(Comparative)

Preparation Of Dispersant From Ethylene-Propylene Copolymer Grafted With Approximately 1.8 Molecules Maleic Anhydride Per Copolymer Molecule A 48.6 weight percent mixture of ethylene-propylene copolymer grafted with approximately 1.8 molecules maleic anhydride per copolymer molecule in oil (700.0 g) was charged into a 2000 Ml 4-neck kettle along with SNO 100 oil (310.1 g). The kettle was equipped with a mechanical stirrer, thermometer, thermocouple, and nitrogen inlet and heated to 180° C. Next, N,N-dimethylaminopropylamine (8.1 g, 0.079 moles) was added along with sulfonic L-46-7 (31.1g). The reaction temperature was maintained at 160° C. for 6 hours. The product (an approximately 33% concentrate analyzed as follows: % N=0.22 (0.21 calc.), and Kinetic Viscosity=583 Cst @100° C.

The prescribed graft and derivatized reduced polymer of the invention are useful as additives for lubricating oils. They provide highly effective dispersancy properties efficiently and economically to single grade lubricating oils. They can be employed in a variety of oils of lubricating viscosity including natural and synthetic lubricating oils and mixtures thereof. The novel additives can be employed in crankcase lubricating oils for spark-ignited and compression-ignited internal combustion engines. The compositions can also be used in gas engines, or turbines, automatic transmission fluids, gear lubricants, metal-working lubricants, hydraulic fluids and other lubricating oil and grease compositions. Their use in motor fuel compositions is also contemplated.

The base oil may be a natural oil including liquid petroleum oils and solvent-treated or acid-treated mineral lubricating oils of the paraffinic, naphthionic and mixed paraffinic-naphthionic types.

In general, the lubricating oil composition of the invention will contain the novel reaction product in a concentration ranging from about 0.1 to 30 weight percent. A concentration range for the additive ranging from about 0.5 to 15 weight percent based on the total weight of the oil composition is preferred with a still more preferred concentration range being from about 1 to 7.5 weight percent.

Oil concentrates of the additives may contain from about 1 to 50 weight percent of the additive reaction product in a carrier or diluent oil of lubricating oil viscosity.

The novel reaction product of the invention may be employed in lubricant compositions together with conventional lubricant additives. Such additives may include additional dispersants, detergents, antioxidants, pour point depressants, anti-war agents and the like.

The novel additive reaction product of the invention was tested for its effectiveness as a dispersant and as an antioxidant in a formulated lubricating oil composition. In all of the examples, the polymer substrate was similar comprising about 60 mole percent ethylene and 40 mole percent propylene. The base lubricating oil used in the dispersancy test was a typical formulated lubricating oil as represented by the values set forth below in Table I.

TABLE I

| Component | Parts By Weight |
|---|---|
| Solvent neutral oil A | 75.25 |
| Solvent neutral oil B | 21.64 |
| Zinc Dialkyldithiophosphate | 1.22 |
| 4.4'dinonyldiphenylamine | .39 |
| Overbased magnesium sulfonate | 1.50 |
| Silicone anti-foamant | 150 PPM |
| Product | 4–10 |
| Analyses | |
| Viscosity Kin 40 C. CS | 30.4 |
| Viscosity Kin 100 C. CS | 5.33 |
| Pour Point, F. | +10 |
| Ash Sulfated, % D874 | 0.88 |
| Phosphorus, % X-Ray | 0.12 |
| Sulfur, % X-Ray Total | 0.32 |
| Zinc, % X-Ray | 0.13 |

Oil had a sp. gr. 60/60° F. of 0.858–0.868; Vis 100° F. 123-133; Pour Point 0° F. Oil B had a sp. gr. 60/60° F. of 0.871-0.887; Vis. 100° F. 325-350; Pour Point +10° F. Zinc salt is a salt of mixed alcohols-isopropanol and $P_2S_5$ product as described in U.S. Pat. No. 3,292,181. The overbased magnesium sulfonate had a TBN of 395 and is a salt of branched $C_{20}$ to $C_{40}$ monoalkybenzene sulfuric acid (MV 530-540) together with about 10% magnesium carbonate, 14% magnesium hydroxide and 4% magnesium sulfate.

The dispersant properties of the additive-containing oil are determined in the Bench Sludge Dispersancy Test as described below.

The Bench Sludge Test

This test is conducted by heating the test oil mixed with synthetic hydrocarbon blowby and a diluent oil at a fixed temperature for a fixed time period. After heating, the turbidity of the resulting mixture is measured. A low percentage turbidity (0 to 20) is indicative of good dispersancy while a high value (20 to 100) is indicative of an oil's increasingly poor dispersancy. The results obtained with the known and present dispersants are set forth below in Table II at 4 and 6.5 percent by weight concentration respectively, in a SAE 30 W fully formulated motor oil.

TABLE II

| Bench Sludge Test Results | |
|---|---|
| Dispersant | Rating |
| Example II (6.5%) | 28 |
| Example II (4.0%) | 33 |
| Reference (SG) | 23 |
| Reference (Good) | 30 |
| Reference (Fair) | 44 |
| Reference (Poor) | 85 |

In order to evaluate the performance of the oils, they were tested by the ASTM Sequence VE Test described below.

ASTM Sequence VE Test

The ASTM Sequence VE test is used to evaluate the performance of engine oils in protecting engine parts from sludge and varnish deposits and valve train wear due to low temperature "stop and go" operation. The test uses a Ford 2.3 L four-cylinder Ranger truck engine. The engine is cycled through three test stages, requiring four hours to complete, for 288 hours or 72 cycles. The Sequence VE engine test results shown in Table II were run in a SAE 15W-40 formulation.

TABLE III

| | ASTM Sequence VE Gasoline Engine Test Results | | | | | | | |
|---|---|---|---|---|---|---|---|---|
| Formula | AS[1] | AV | RACS | PSV | % ORC | % OSC | $CLW_{avg}$ | $CLW_{max}$ |
| I[2] | 9.6 | 6.4 | 9.5 | 7.4 | 0.0 | .0 | .8 | 1.5 |
| II[3] | 8.6 | 5.0 | 7.8 | 7.0 | 10.0 | 10.0 | .6 | 0.9 |
| Limits | $9.0_{min}$ | $5.0_{min}$ | $7.0_{min}$ | $6.5_{min}$ | $15.0_{max}$ | $20.0_{max}$ | $5.0_{max}$ | $15_{max}$ |

[1]AS, AV, RACS, PSV, ORC, OSC, $CLW_{avg}$ and $CLW_{max}$ denote: average sludge, average varnish, rocker arm cover sludge, piston skirt varnish, oil ring clogging, oil screen clogging, cam lobe wear average, and cam lobe wear maximum, respectively.
[2]SAE 15W-40 fully formulated motor oil w/3.0% of Example II and 4.0% of Example V.
[3]SAE 15W-40 fully formulated motor oil w/1.0% of Example II and 6.0% of Example V.

The results in Table III, above, illustrate the effectiveness of the novel dispersant of this invention. The formulas run in the ASTM Sequence VE gasoline engine test contained a total of 7% dispersant. Each formula contains a mixture of the two dispersants, the polyisobutenyl succinimide type, very well described in the prior art (Example V, Comparative) and the novel type described herein. The results show the effectiveness of replacing 2.0 weight percent of the Example V dispersant with 2.0 weight percent of the Example II dispersant in a formula.

VW (AK-6) SEAL COMPATIBILITY TEST

The test described below is designed to test the Viton Seal Compatibility for a crankcase lubricating oil composition containing a nitrogen-containing dispersant.

The Viton AK-6 seal is soaked at 302° F. for 168 hours in the oil being tested. The elastomer to oil ratio is 1/80. Then the sample is tested for percent change in elongation (% EC), percent change in tensile strength (% TSC), and the degree of cracking. The dispersants are in the oil formulation at 5.5 weight percent. The results in Table IV show the effectiveness of Example II over Example VI (which employed a polyamine well known in the prior art).

TABLE IV

| VW (AK-6) SEAL Compatibility Test Results | | | |
|---|---|---|---|
| Functional Group | % EC | % TSC | Cracks |
| Example II | −3.0 | −2.0 | N |
| Example VI | −31.6 | −34.2 | N |
| Limits | +/−25 | +/−20 | N |

The dispersant additive of the instant invention derives its effectiveness from the use of the specific amine-substituted phenothiazines described hereinabove. It is contemplated, however, that valuable economies may be achieved when the prescribed reaction products of the invention are used in combination with other reaction products prepared from different amines. More specifically, grafted copolymers having the prescribed molecular weight range and prescribed graft level may be reacted with an amine substituted phenothiazine and an amine having in its structure one primary amine group and either a tertiary amine group or a highly hindered secondary amine group. Examples of such amines include aminopropylmorpholine, aminoethylmorpholine, N′,N′-dimethylaminopropylamine, N′,N′-dimethylethylamine, N-methylaminopropylpiperzine.

What is claimed is:

1. A dispersant additive composition prepared by the steps comprising:

(a) reacting a polymer prepared from ethylene and at least one $C_3$ to $C_{10}$ alpha-monoolefin and, a polyene selected from non-conjugated dienes and trienes comprising from about 15 to 80 mole percent of ethylene from about 20 to 85 mole percent of said $C_3$ to $C_{10}$ alpha-monoolefin and from about 0 to 15 mole percent of said polyene, said polymer having a number average molecular weight ranging above 80,000, with an excess in equivalence of an olefinic carboxylic acid acylating agent per equivalent weight of said polymer, said process comprising heating said polymer to a molten condition at a temperature ranging from about 250° C. to about 450° C. and, simultaneously, or sequentially in any order, reducing the molecular weight of said polymer with mechanical shearing means and grafting olefinic carboxylic acylating agent onto said polymer, thereby producing a grafted, reduced molecular weight polymer having a number average molecular weight ranging from about 5,500 to about 50,000 and having at least 1.8 molecules of said carboxylic acid acylating function grafted onto each copolymer molecule of said reduced polymer;

(b) reacting said grafted reduced polymer in (a) with an amine substituted phenothiazine

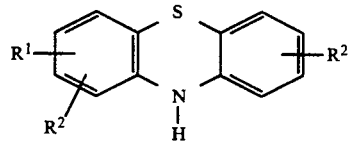

where $R^1$ is —$NH_2$,

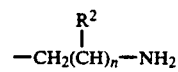

in which n has a value from 1–10, $NH_2$-aryl-, or $NH_2$-arylalkyl-; and $R^2$ is H, or a ($C_1$–$C_{24}$) branched or straight chain alkyl, alkenyl, alkoxy, aralkyl, hydroxy or aminoalkyl radical to provide a dispersant additive reaction product; and (c) recovering said dispersant additive reaction product.

2. The composition of claim 1 wherein said reaction comprises heating said polymer to a molten condition, mixing said olefinic carboxylic acylating agent with said polymer and subjecting said mixture in the absence of a solvent to mechanical shearing means to graft said olefinic carboxylic acylating agent onto said polymer and reduce the molecular weight of said polymer to a range from 5,500 to 50,000.

3. The composition of claim 1 wherein said grafted reduced polymer has a number average molecular weight from about 6,000 to 20,000.

4. The composition of claim 1 wherein said grafted reduced polymer has a number average molecular weight from about 7,000 to 15,000.

5. The composition of claim 1 wherein said grafted reduced polymer comprises from about 25 to 75 mole percent ethylene and from about 25 to 75 mole percent of a $C_3$ to $C_8$ alpha-monoolefin.

6. The composition of claim 1 wherein said polymer comprises from about 40 to 65 mole percent ethylene and from about 35 to 60 mole percent of propylene.

7. The composition of claim 4 which contains from about 0.1 to 10 mole percent of a polyene.

8. The composition of claim 1 wherein said olefinic carboxylic acid acylating agent is maleic anhydride.

9. The composition of claim 1 wherein said olefinic carboxylic acid acylating agent is itaconic anhydride.

10. The composition of claim I wherein said grafted reduced polymer has from about 2 to 5 molecules of said carboxylic acid acylating function per molecule of said polymer.

11. The composition of claim 1 wherein said grafted reduced polymer has from about 2.25 to 4 molecules of said carboxylic acid acylating function per molecule of said polymer.

12. The composition of claim 1 wherein said grafted reduced polymer has from about 2.5 to 3.75 molecules of said carboxylic acid acylating function per molecule of said reduced polymer.

13. The composition of claim 1 wherein the mechanical shearing means for the reaction between said polymer and said carboxylic acid acylating agent is an extruder.

14. The composition comprising a mixture of the reaction product of claim and the reaction product of a grafted polymer and an amine having in its structure one primary amine group and either a tertiary or a highly hindered secondary amine group.

15. A composition comprising the reaction product of the amine substituted phenothiazine of claim 1(b) and an amine selected from the group consisting of aminopropylmorpholine, aminoethyl- morpholine, and N-methyl-aminopropylpiperzine with the product of claim 1(a).

16. A lubricating oil composition comprising a major amount of an oil of lubricating viscosity and a minor amount effective to impart dispersancy properties to said oil of the additive composition of claim 1.

17. A lubricating oil composition comprising a major amount of an oil of lubricating viscosity containing from about 0.1 to 30 weight percent of said additive of claim 1.

18. A lubricating oil composition comprising a major amount of an oil of lubricating viscosity containing from about 0.5 to 15 weight percent of said additive of claim 1.

19. A lubricating oil composition comprising a major amount of an oil of lubricating viscosity and from about 1 to 7.5 weight percent of said additive of claim 1.

20. A single grade lubricating oil composition comprising an oil of lubricating viscosity and from about 0.5 to 15 weight percent of said additive of claim 1.

* * * * *